(12) United States Patent
Pendarvis (10) Patent No.: US 7,090,267 B2
(45) Date of Patent: Aug. 15, 2006

(54) UNIVERSAL HEAVY-DUTY FRONT BUMPER AND MOUNTING BRACKET SYSTEM FOR HUMMER H1 A1/A2

(75) Inventor: Brian Pendarvis, Fullerton, CA (US)

(73) Assignee: Pendarvis Manufacturing, Inc., Anaheim, CA (US)

( * ) Notice: Subject to any disclaimer, the term of this patent is extended or adjusted under 35 U.S.C. 154(b) by 74 days.

(21) Appl. No.: 11/037,732

(22) Filed: Jan. 18, 2005

(65) Prior Publication Data

US 2006/0157993 A1    Jul. 20, 2006

(51) Int. Cl.
*B60R 19/04* (2006.01)

(52) U.S. Cl. ..................... 293/155; 293/133

(58) Field of Classification Search .............. 293/155, 293/102
See application file for complete search history.

(56) References Cited

U.S. PATENT DOCUMENTS

| | | | | |
|---|---|---|---|---|
| 4,322,106 A | * | 3/1982 | Nespor | 293/121 |
| 4,817,307 A | * | 4/1989 | Hardgrove | 37/197 |
| 5,150,935 A | * | 9/1992 | Glance et al. | 293/136 |
| 5,277,465 A | * | 1/1994 | Weir | 293/142 |
| 5,618,074 A | * | 4/1997 | Weast | 293/155 |
| 5,695,228 A | * | 12/1997 | Storer | 293/115 |
| 5,876,078 A | * | 3/1999 | Miskech et al. | 293/133 |
| 6,139,092 A | * | 10/2000 | Doner et al. | 293/155 |
| 6,474,522 B1 | * | 11/2002 | Johnson | 224/515 |
| 6,971,694 B1 | * | 12/2005 | Sakuma et al. | 293/154 |
| 2005/0099027 A1 | * | 5/2005 | Seksaria | 293/133 |

OTHER PUBLICATIONS

Ibis Tek brochure, Front Ram Bumper, not dated, 2 pages, Butler, PA & Switzerland.
Ibis Tek brochure, Low Profile Front Ram Bumper, not dated, 2 pages, Butler, PA & Switzerland.

* cited by examiner

*Primary Examiner*—Kiran B. Patel
(74) *Attorney, Agent, or Firm*—Stetina Brunda Garred & Brucker (57) ABSTRACT

A universal heavy-duty bumper and mounting system is provided which is adapted to be attached to a HMMWV H1 A1 or A2 configured vehicle. The system includes a right-side and leftside universal mounting bracket and a bumper adapted to be received and attached by the bumper brackets such that the bumper transversely spans both brackets in a perpendicular orientation. The system may further include a couple pairs of heavy-duty universal swivel attachment brackets for receiving accessories, each adapted to be mounted on a front fascia plate of the bumper. The system may further include an upright main support bar disposed within a gap defined by each pair of swivel attachment brackets, wherein each support bar is adapted to rotate from an upright position to a lowered position. The bumper includes a planar main fascia plate having a perimeter shape defined by a generally straight upper side, a tiered lower side, a pair of generally straight side edges interconnecting the upper and lower sides, and a planar side edge connected to and surrounding the perimeter of main fascia plate.

12 Claims, 10 Drawing Sheets

_Fig. 16_

_Fig. 17_

UNIVERSAL HEAVY-DUTY FRONT BUMPER AND MOUNTING BRACKET SYSTEM FOR HUMMER H1 A1/A2

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates to universal bumpers and bracket systems for attaching the same to various production configurations of the HUMMER HMMWV (or "H1") vehicle. In particular, the present invention relates to a universal bumper and bracket system which is adapted to be installed into two different versions of the HUMMER HMMWV, including the pre-1992 "A1" model and the post-1992 "A2" model. Furthermore, the present invention includes various accessories, such as brush guards, which may be utilized in combination with the universal bumpers and bracket systems.

2. Background of the Invention

In March of 1983, the U.S. Army Tank-Automotive & Armaments Command awarded the AM General Corporation Division a $1.2 billion contract to produce 55,000 High Mobility Multipurpose Wheeled Vehicles [HMMWV; pronounced "HUMVEE"] to be delivered in 15 different configurations over a five year period. The winning design incorporated high ground clearance, a low silhouette, forward visibility and minimum weight, all combined with ease of operation and reliability.

Known officially as the M998 Series, and referred to as the "H1" (since the introduction of the civilian "H2") and/or the HUMVEE, this technologically advanced 1¼-ton, 4×4, multipurpose vehicle appears to have fully answered the military's need for superior mobility in a tactical field environment. The HUMMER H1 was versatile, mobile, and fast, and replaced an assortment of vehicles, including some M-151s (¼-ton utility vehicles, such as the well-known JEEP), all M-274s (¼-ton Mules), all M-561s (1½-ton Gama Goats), and some M-880s (1¼-ton pick-up trucks).

HUMMER H1's were tested for more than 600,000 miles over rugged courses simulating worldwide off-road conditions in combat environments. Drivers from the military and AM General performed numerous stringent tests in an effort to test the vehicle's limits. The HUMVEE's were driven over steep rocky hills, through deep sand and mud pits, in water up to 60 inches deep, in desert heat and in frigid Arctic environments. Amazingly, the HUMMER H1 passed the military's validation testing with unprecedented success.

As a centerpiece of the Army's vehicular force modernization, HMMWV's are air transportable, maintainable, reliable, and survivable. They meet all of these requirements while incorporating new higher standards of reliability for combat vehicles. The HUMMER H1's scored very high on Reliability, Availability, Maintainability, and Durability (RAM-D) requirements and specifications. For instance, during initial production tests, the HUMVEE proved to be nearly twice as durable as the Army required.

One major advantage the HMMWV has over other vehicles is its unique multipurpose or modular platform. It was designed to be built in fifteen configurations (cargo/troop carriers, weapons carriers, ambulances, and shelter carriers) share a common engine, chassis and transmission, with 44 interchangeable parts. As a result, fewer training hours are necessary for the mechanics who maintain it. With such a simplified supply, maintenance and logistics system, essentially only one set of common parts for the fifteen configurations is required. In terms of economic, this equates to lower life cycle costs.

One primary aspect of the HUMMER H1 design is the vehicle high ground clearance which is a prerequisite for superior mobility. The HMMWV has a full 16 inches of ground clearance which is considered an engineering feat considering that the HMMWV stands only 72 inches high. Full-time four-wheel drive, independent suspension, steep approach and departure angles, sixty percent slope-climbing and 60 inch water-fording capability combine with its high ground clearance to make the HMMWV an exceptional off-road vehicle.

As has been demonstrated in Desert Storm, the Iraqi War and the ongoing occupation of Iraq, the HUMVEE has proved itself, becoming a well-known icon affiliated with freedom fighting. Yet, even though the performance potential of the HUMMER H1 has been described as unlimited, due to its multipurpose platform and its ability to accommodate a wide range of weapons, new challenges are being presented to the HUMMER H1 of which the vehicle was not necessarily designed to handle.

Through lessons learned in urban combat warfare, it is becoming apparent that because H1 is not adapted to use its front bumper to move or ram heavy objects. That is to say, when the HUMMER H1 is required to smash through a barrier, push other vehicles, or ram an object under stressful combat situations, the front-end of the vehicle is prone to being damaged. This is apparent because the high-clearance front-end design of the HUMMER H1 utilizes smaller than average front bumpers for ground clearance.

It would be beneficial to provide the HUMMER H1 with a heavy-duty bumper and bracketing system which is designed for heavy-duty front-end usage, a task which was apparently not considered major design factor with respect to the vehicle's original design specifications. Ideally, it would be advantageous to provide a universal design which would fit different production variants of the HUMMER H1. For instance, the HUMMER H1 has been upgraded through the years; primarily, there being two different versions of the HUMMER H1 which support military applications, including the pre-1992 "A1" model and the post-1992 "A2" model. Therefore, it would prove to be beneficial and cost effective to provide a universal heavy-duty bumper and attachment bracket system which could be used at least for both the A1 and A2 variants of the HUMMER H1. Preferably, the heavy-duty bumper and attachment bracket system will be adapted to incorporate a modular platform of accessories, such as bumper guards, brush guards, tow bars, tie-down attachments, winch mounting capabilities, and various ramming devices.

BRIEF SUMMARY OF THE INVENTION

The present invention provides a heavy-duty universal bumper and bracket system which is adapted to be installed into two different versions of the HUMMER HMMWV, including the pre-1992 "A1" model and the post-1992 "A2" model. It is noted that the HUMMER HMMWV H1 A1 is basically the same vehicle as the HUMMER HMMWV H1 A2, except for some minor modifications. The present invention is designed for heavy-duty front-end usage, a task which was apparently not a major design consideration with respect to the vehicle's original design specifications. The present invention is further adapted to incorporate a modular platform of accessories, such as bumper guards, brush guards, tow bars, tie-down attachments, winch mounting capabilities, and various ramming devices.

According to an embodiment of the present invention, a universal heavy-duty bumper and mounting system is provided which is adapted to be attached to a HMMWV H1 A1 or A2. The mounting system includes a rightside and left side universal heavy-duty bumper mounting bracket.

An exemplary bracket preferably comprises a planar main bracket plate having an inboard side and outboard side, the bracket plate adapted to be interfaced and attached to an inboard side surface of one the rightside or leftside frame members; a channel shaped bumper bracket adapter attached to a forward edge of the main bracket plate in a generally perpendicular orientation; a planar outboard strengthening gusset attached to the outboard side of the main bracket plate and to an inner side of the channel shape bumper in a perpendicular orientation; a longitudinal and planar inboard backing plate bracket/gusset attached to the inboard side of the main bracket in a perpendicular orientation, wherein the bracket/gusset extends beyond the rearward edge of the main bracket plate; and a generally rectangular transmember backing plate attached to the bracket/gusset in a perpendicular orientation, the backing plate adapted to be interfaced and abut against a main front crossmember of the H1.

The present invention may further include a heavy-duty bumper adapted to be received and attached by the rightside and leftside bumper brackets such that the bumper transversely spans both brackets in a perpendicular orientation.

According to another aspect of the present invention, the universal bumper and mounting system, further comprises a couple pairs of heavy-duty universal swivel attachment brackets for receiving accessories, each swivel attachment bracket adapted to be mounted on a front fascia plate of the bumper. Each swivel attachment bracket preferably comprises a generally rectangular shaped bumper attachment plate adapted to be interfaced to the bumper; a generally rectangular shaped swivel interface plate attached to a longitudinal edge of the bumper attachment plate in a perpendicular orientation; an outer protector plate attached to a forward longitudinal edge of the swivel attach plate such that the protector plate is positioned over the bumper attachment plate in a parallel and opposing orientation; a pair of end plates positioned at upper and lower end edges of each of the bumper attachment plate, swivel interface plate and outer protector plate; and an intermediate gusset positioned in a middle region of each of the bumper attachment plate, swivel interface plate and outer protector plate. For each pair of swivel attachment brackets, the swivel interface plate for each bracket is positioned next to each other in a parallel orientation such that a gap is provided between each swivel interface plate, wherein the gap is adapted to receive an accessory.

According to another aspect of the present invention, the universal bumper and mounting system, further comprises an upright main support bar disposed within each gap defined by each pair of swivel attachment brackets, wherein each upright main support bar is adapted to rotate from an upright position to a lowered position. Each upright main support bar preferably comprises a planar plate defined by a lower rotating arm portion defined by an straight lower inner arm edge and a straight lower outer arm edge oriented in a parallel orientation with respect to each other and a lower end edge interconnecting the inner and outer arm edges, the lower rotating arm adapted to be received and rotatably attached within the gap; and an upper portion of the arm integrally formed to an upper region of the rotating arm portion, the upper portion defined by a bumper notch projecting outward from an upper end of the inner arm edge of the rotating arm portion in a perpendicular orientation, a straight inside upper edge connecting to an end of the bumper notch and projecting upward in a perpendicular orientation, an upper distal end side connecting to an upper end of the inside straight upper edge and projecting forward in a generally perpendicular orientation, a forward inclined edge projecting downward from the upper end and connecting to an upper end of the lower outer arm edge of the lower rotating arm portion.

According to yet other aspects of the present invention, an external bumper strip may be attached to the forward inclined edge and lower outer arm edge of each upright main support bar in a perpendicular orientation. Furthermore, a plurality of receiving holes may be disposed through the planar plate of each upright main support bar. Still further, a plurality tubes received within the plurality of receiving holes such that the plurality of tubes span each upright main support bar in a generally perpendicular orientation, wherein the plurality of tubes form at least a portion a brush guard.

According to still other aspects of the present invention, the bumper includes a planar main fascia plate having a perimeter shape defined by a generally straight upper side, a tiered lower side, and a pair of generally straight side edges interconnecting the upper and lower sides. The bumper preferably further comprises a planar side edge connected to and surrounding the perimeter of main fascia plate in a perpendicular orientation with respect to the main fascia plate and projecting in a backwards direction with respect to the main fascia plate. Also, the bumper may have a winch port is disposed through the main fascia plate.

According to another embodiment of the present invention, a universal heavy-duty bumper mounting bracket adapted to be attached to a main front frame crossmember and one of a rightside or leftside frame member of a HMMWV H1 A1 or A2 configured vehicle.

The aforementioned mounting bracket preferably comprises a substantially planar main bracket plate having an inboard side and outboard side, the main bracket plate adapted to be interfaced and attached to an inboard side surface of one of the rightside or leftside frame member. The main bracket plate includes a generally straight horizontally oriented upper edge; a generally straight forward edge arranged in a perpendicular orientation with respect to the upper edge; a rearward edge adapted to abut against or be positioned proximate to a structural flange attached to a main front crossmember and one of the rightside or leftside frame member of the H1; and a lower edge having a generally straight rear portion connected to the rear edge and a downwardly inclined forward portion connected to the forward edge, wherein a plurality of mounting holes are disposed through the main bracket plate for attaching the mounting bracket to one of the rightside or leftside frame member.

The aforementioned mounting bracket preferably further comprises a channel shaped bumper bracket adapter attached to the main bracket plate in a generally perpendicular orientation, the bumper bracket adapter including a web having an outer side and inner side, and an upper and lower flange integrally formed to the web, wherein the web is attached to the forward edge of the main bracket plate, the upper flange is attached to a forward portion of the upper edge of the main bracket plate, and the lower flange is attached to the downwardly inclined forward portion of the main bracket plate, wherein a plurality of mounting holes are disposed through the web for receiving bumper fastening hardware.

The aforementioned mounting bracket preferably also further comprises a planar outboard strengthening gusset attached to the outboard side of the main bracket plate and to the inner side of the web in a perpendicular orientation.

The aforementioned mounting bracket preferably also further comprises a longitudinal and planar inboard backing plate bracket/gusset attached to the inboard side of the main bracket in a perpendicular orientation, wherein the bracket/gusset extends beyond the rearward edge of the main bracket plate; and a generally rectangular transmember backing plate attached to the bracket/gusset in a perpendicular orientation, the backing plate adapted to be interfaced against the main front crossmember of the H1, wherein a plurality of mounting holes are disposed through the backing plate for attaching the backing plate the main front frame crossmember.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION OF THE INVENTION

According to FIGS. 1–17, the present invention provides a heavy-duty universal bumper 8 and bracket system 44, 45, 64 which is adapted to be installed into two different versions of the HUMMER HMMWV, including the pre-1992 "A1" model and the post-1992 "A2" model. In particular, the present invention is designed for heavy-duty front-end usage, a task which was apparently not a major design consideration with respect to the vehicle's original design specifications. The present invention is further adapted to incorporate a modular platform of accessories, such as bumper guards, brush guards, tow bars, tie-down attachments, winch mounting capabilities, and various ramming devices.

The HUMMER HMMWV H1 A1 is basically the same vehicle as the HUMMER HMMWV H1 A2, except for some minor modifications. Some of the noticeable differences with respect to the front bumper systems of the aforementioned vehicles will now be discussed in greater detail.

Figure 1:
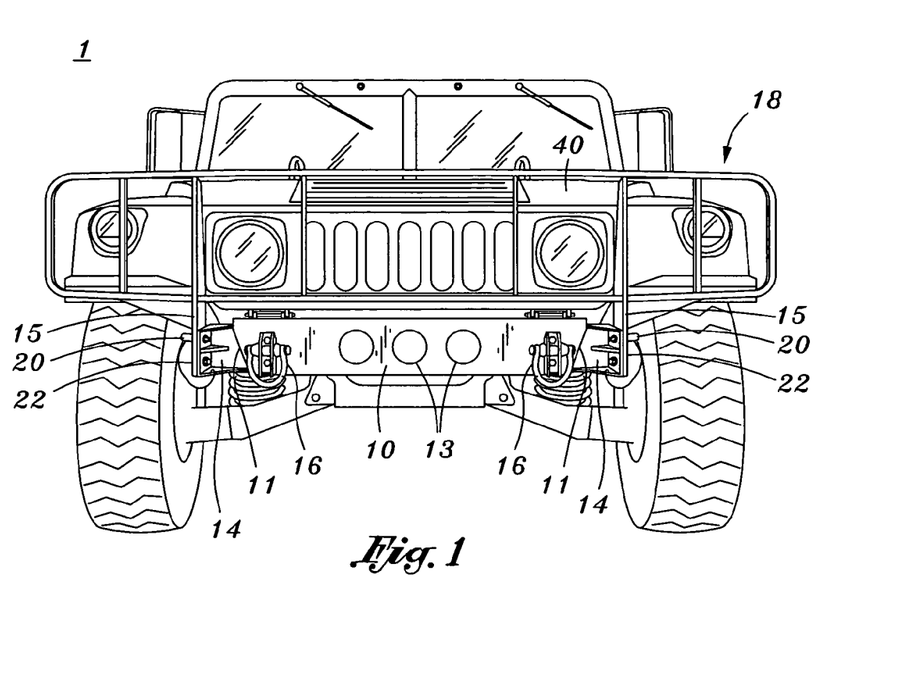
FIG. 1 is a front view of the bumper region of a pre-1992 military HUMMER H1 A1.

FIG. 1 is a front view of the bumper region of a pre-1992 military HUMMER H1 A1 (reference numeral 1). From the front of the vehicle, the "A1" version of the vehicle can be determined by the configuration/shape of the front bumper 12. The A1 bumper (reference numeral 10) is longer and thinner than the A2 bumper (see FIG. 2, reference numeral 12). Typically, the A1 bumper has three round holes 13 disposed through the bumper 10 and inwardly inclined bumper edges. Other recognizable front-end components utilized on the A1 configured HUMMER are the outrigger brackets 14 positioned at the distal ends of the bumper 10.

The outrigger brackets 14 are adapted to receive the main upright attachment arms 15 of a brush guard 18. The brush guard 18 is adapted to swivel down in front of the vehicle so that the hood 40 of the HUMMER A1 can be raised. Other common visible features which can help one distinguish the A1 from the A2 are the combination tie-down/tow bar adapters 16 which are typically installed on the bumper 10 between the three round holes 13 and the outrigger brackets 14.

Figure 2:
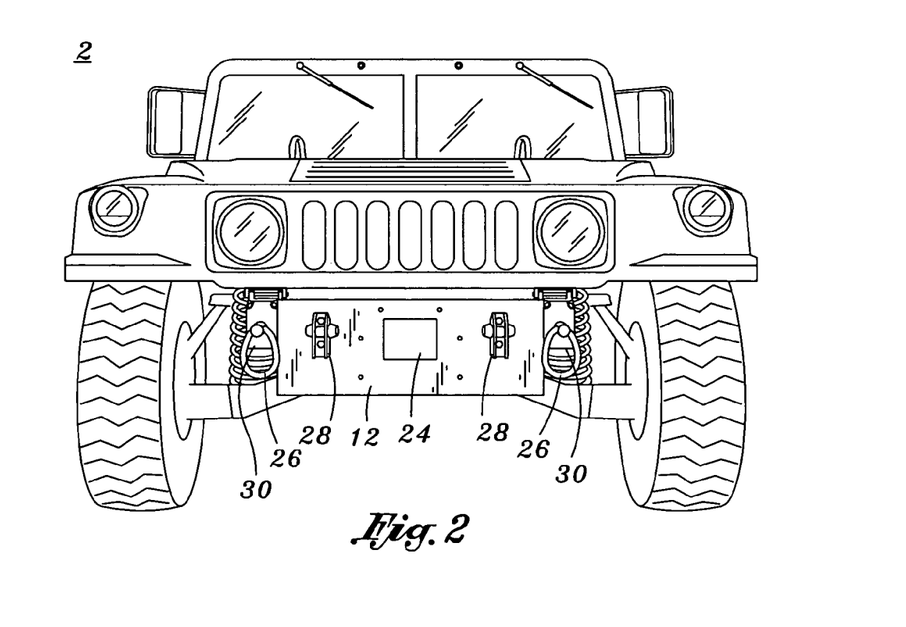
FIG. 2 is a front view of the bumper region of a post-1992 military HUMMER H1 A2.

FIG. 2 is a front view of the bumper region of a post-1992 military HUMMER H1 A2 (reference numeral 12). From the front of the vehicle, the "A2" version of the vehicle can be determined by the configuration/shape of the front bumper 12. The A2 bumper (reference numeral 12) is shorter and wider than the A1 bumper (see FIG. 1, reference numeral 10). Typically, the A2 bumper may have a rectangular winch port 24 disposed there through the front fascia of the bumper 12. One of the noticeable differences between the A2, as compared to the A1, is that the A2 was adapted to have a winch 25 (not installed on illustrated vehicle 2) installed behind the bumper 12. Other recognizable front-end components utilized on the A2 configured HUMMER H1 are the individual tie-downs 26 installed into the distal ends of outboard forward hood hinge brackets 30 installed on the outboard sides of the rightside frame member 32 (not shown in FIG. 2) and the leftside frame member 33. Also, individual tow bar adapters 28 (as compared to combination tie-down/tow bar adapters 16 installed on the A1) are attached to the bumper 12 between the winch port 24 and individual tie-downs 26.

Figure 3:
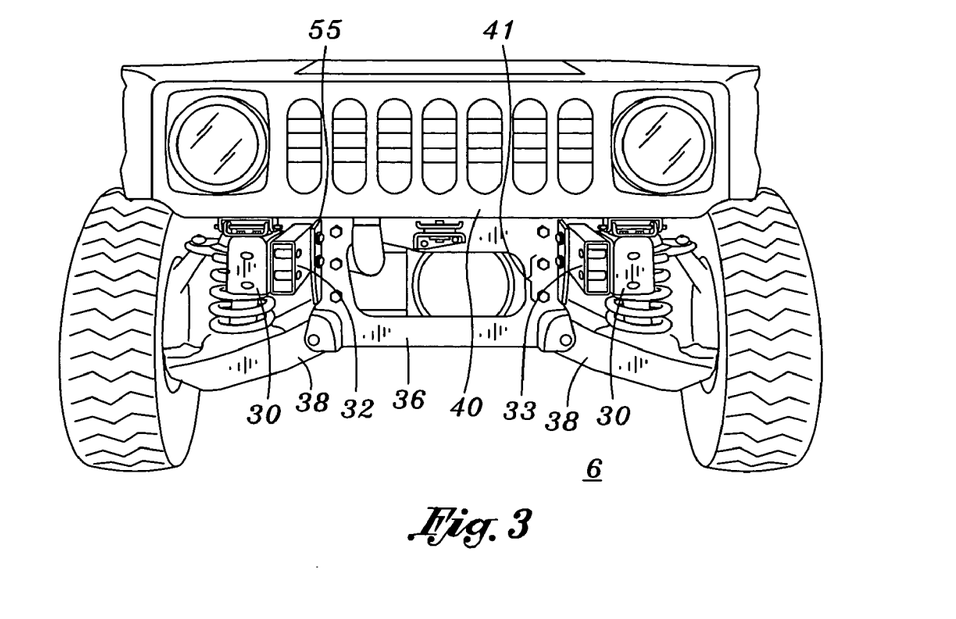
FIG. 3 is a front view of the front-end of a HUMMER H1 (common to both the A1 and A2) with some stock bracketing removed before the present invention is installed into the HUMMER H1 A1/A2, according to an aspect of the present invention.

FIG. 3 is a front view of the front-end of a HUMMER H1 (common to both the A1 and A2) with stock bumpers 10, 12 removed from the vehicle. As noted earlier, the H1 A1 is basically the same vehicle as the H1 A2, except for some minor modifications. Once the stock bumpers 10, 12 are removed, it may be necessary to further remove other various brackets from both the A1 and A2 such that the present invention may be installed onto the subject vehicle. For instance, with regard to the A1, the outrigger brackets 14 (see FIG. 1) should be removed. By removing the outrigger brackets 14 from the vehicle, the present invention may now be installed on the A1. The end result is an open cavity in the front of the A1 in which the main front frame crossmember 36 and lower A-arms 38 are clearly visible and accessible. Furthermore, the inboard sides of the forward portions of rightside frame member 32 and the leftside frame member 33 are clearly visible and unobstructed. Also visible are structural flanges 55 which interconnect the frame members 32, 33 to the main front frame crossmember 36 and a plurality of fastening hardware (i.e., bolt heads).

Figure 4:
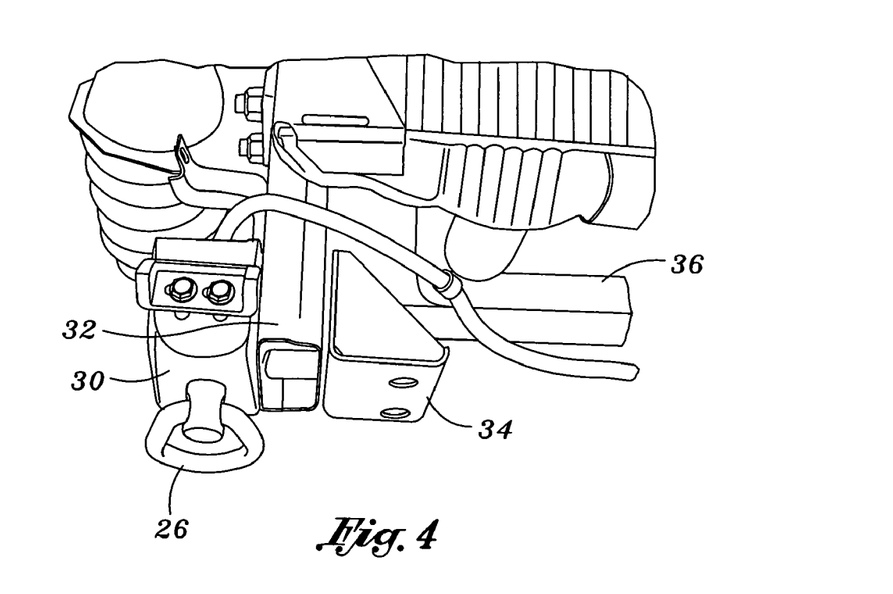
FIG. 4 is an upper frontal perspective of the stock brackets used to mount the stock bumper onto the HUMMER A2.

FIG. 4 is an upper frontal perspective of the stock inboard bumper brackets 34 used to mount the stock bumper 12 onto the HUMMER A2. With regard to the A2, a pair of stock inboard bumper brackets 34 (one on the rightside frame member 32 and another on the leftside frame member 33) should be removed. A can be seen in FIG. 4, the stock inboard bumper brackets 34 are attached to the forward end of the rightside 32 and leftside 33 (not shown) frame members. By removing the bumper brackets 34 from the vehicle, the present invention may now be installed on the A2. As with the A1, the end result is an open cavity in the front of the A1 in which the main front frame crossmember 36 is clearly visible and accessible. Furthermore, the inboard sides of the forward portions of rightside frame member 32 and the leftside frame member 33 are clearly visible and unobstructed.

Figure 5:
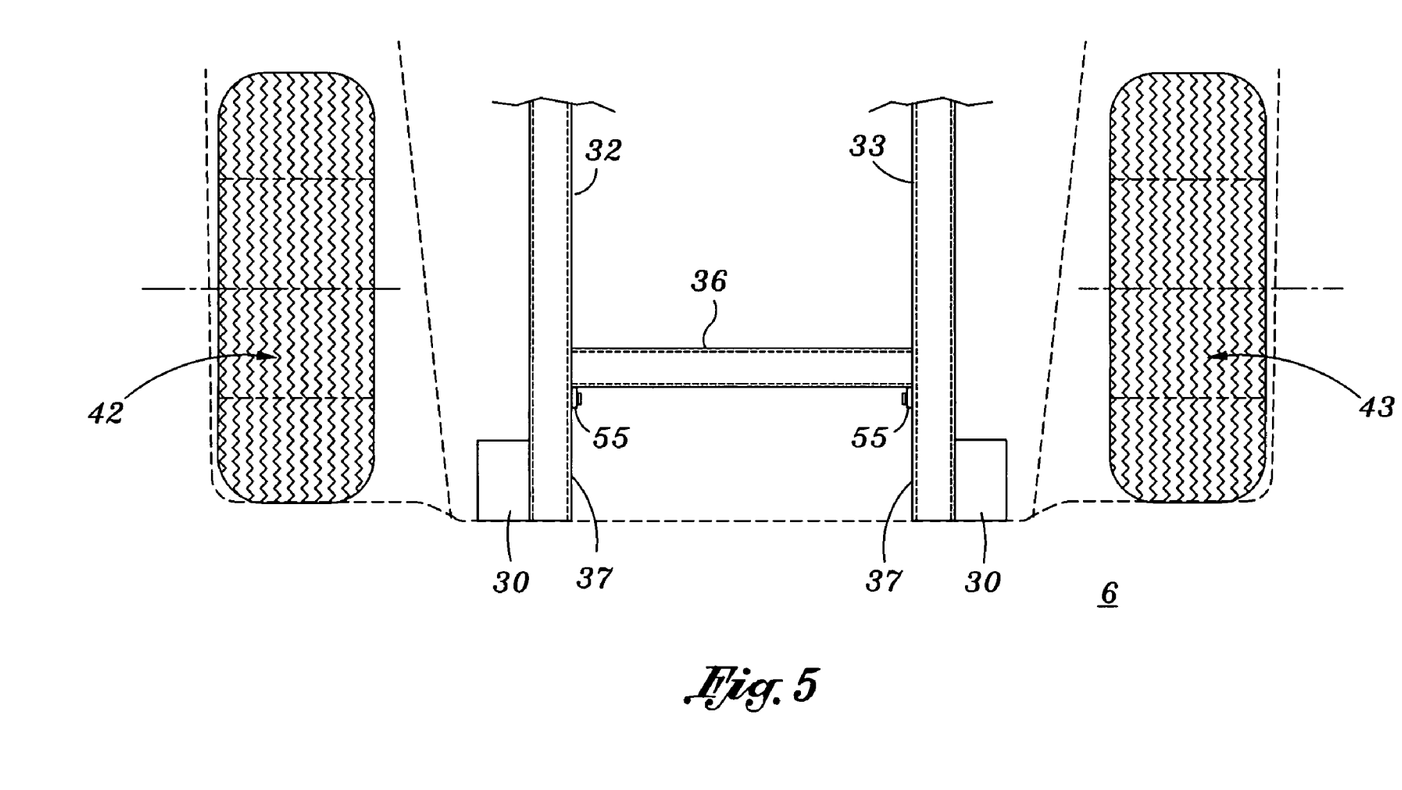
FIG. 5 is a top view of the front-end layout of the HUMMER H1 frame rails common to both the A1 and A2 HUMMER before the present invention is installed into the HUMMER H1 A1/A2, according to an aspect of the present invention.

FIG. 5 is a top view of the front-end layout of the HUMMER H1 frame rails common to both the A1 and A2 before the present invention is installed into the subject vehicle, according to an aspect of the present invention. Once the stock bumpers 10 or 12 have been removed and either the outrigger brackets 14 from the A1 have been removed, or the inboard bumper brackets 34 from the A2 have been removed, the vehicle [hereinafter referred to as the "HUMMER H1 A1/A2" or the like] is now prepared for the installation of the present invention.

As discussed above and seen in both FIGS. 3 and 5, a void will exist between the vehicle's rightside frame member 32 and the leftside frame member 33. Furthermore, the outboard forward hood hinge brackets 30 common to both the A1 and A2 should remain installed on the outboard forward sides of each respective frame member 32, 33. Also, it is noted that the main front crossmember 36 which interconnects the rightside frame member 32 to the leftside frame member 33 is noticeably in open view and now accessible from the front-end of the vehicle. Moreover, the forward inboard sides 35, 37 respectively of the rightside frame member 32 and the leftside frame member 33 are unobstructed such that they may receive rightside and leftside universal heavy-duty bumper mounting brackets 44, 45 (see FIGS. 8 and 9 for an exemplary embodiment of the leftside universal heavy-duty bumper mounting brackets 45).

Figure 6:
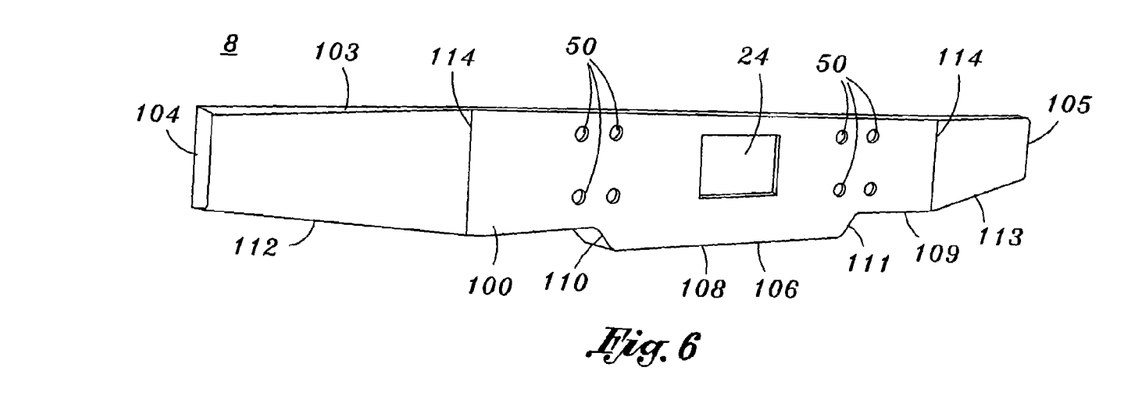
FIG. 6 is a front perspective view of an exemplary universal heavy-duty bumper which may be installed on both the A1 and A2, according to an aspect of the present invention.
Figure 7:
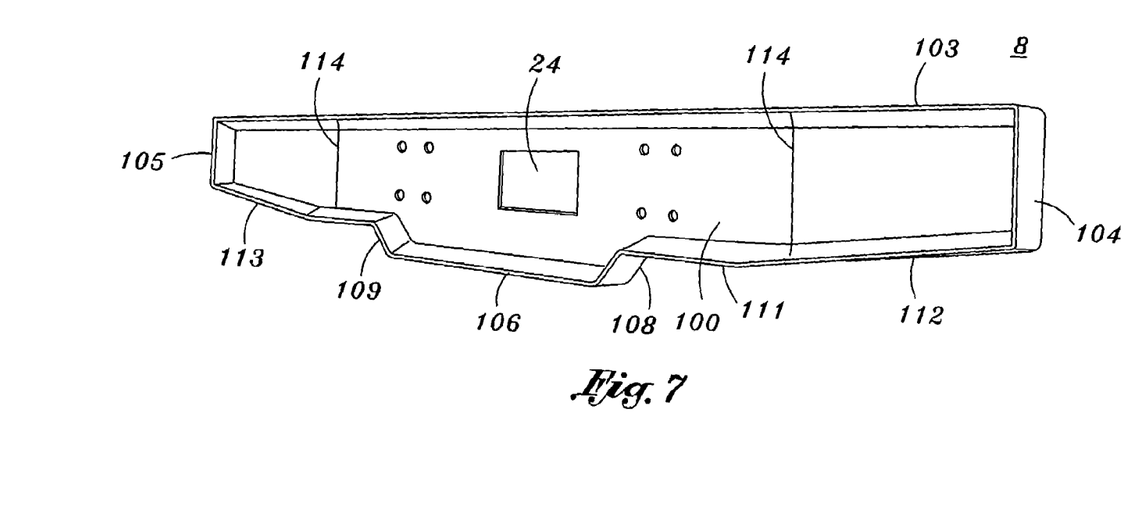
FIG. 7 is a rear perspective view of the exemplary universal heavy-duty bumper from FIG. 6, according to an aspect of the present invention.

FIG. 6 is a front perspective view of an exemplary universal heavy-duty bumper 8 which may be installed on both the A1 and A2, according to an aspect of the present invention; while FIG. 7 is a rear perspective view of the exemplary universal heavy-duty bumper 8 from FIG. 6, according to an aspect of the present invention. The bumper 8 may be constructed from any material known in the art for manufacturing heavy-duty rated bumpers.

The bumper 8 includes a main fascia plate 100 surrounded by planar perimeter side edges (or flanges) 103 through 113 which are attached to the main fascia plate in a perpendicular orientation and of which project towards the grill of the vehicle once the bumper is installed. The upper side of the bumper 8 includes the upper perimeter side edge 103 which is preferably generally straight. The ends of the bumper 8 are defined by rightside edge 104 and leftside edge 105 which are preferably oriented downward (i.e., perpendicularly oriented) to the upper perimeter side edge 102. The bottom perimeter side of the bumper 8 preferably has a downwardly tiered shape which provides progressively more ground clearance from the center of the bumper 8 to the rightside and leftside edges 104, 105. In particular, the bottom center perimeter side of the bumper 8 preferably includes a straight center lower perimeter side edge 106 which is oriented generally parallel and opposing thereto to the upper perimeter side edge 102. On each side of the straight center lower perimeter side edge 106 is a lower rightside inclined side edge 108 and a lower leftside inclined side edge 109. Both inclined side edges 108 and 109 are oriented generally at about at a 45 degree angle to the straight center lower perimeter side edge 106. Connected to the upper ends of inclined side edges 108 and 109, respectively, are right and left lower intermediate side edges 110, 111 which preferably are generally parallel and opposing thereto the upper perimeter side edge 102 and parallel and offset with respect to the center lower perimeter side edge 106. And tying the rightside and leftside edges 104, 105 to the right and left lower intermediate side edges 110, 111, respectively, are right and left lower inclined edges 112, 113.

Other features of the bumper 8 include an optional winch port 24 disposed through the main fascia plate 100 which is preferably rectangular in shape. Additionally, mounting holes 50 are disposed through the main fascia plate 100 in a pattern which will mate to a bumper bracket adapter 60 (see FIGS. 8 and 9). It is further noted that each end of the bumper 108 may be optionally bent inwards at seams 114 about where the right and left lower intermediate side edges 110, 111 are connected to the right and left lower inclined edges 112, 113. Thus as viewed from above, the rightside and leftside distal ends of the bumper 8 would be angled inwards towards the right and left front fender corners of the vehicle. Such an optional feature may be utilized so that the bumper 8 does not excessively project outward proximate the front corners of the vehicle. It is also envisioned that various strengthening gussets (not illustrated) may be integrated into the backside of the bumper such the gussets interconnect the side edges 103 through 113 and the backside of the main fascia plate 100. Or in the alternative, a strengthening plate may enclosed the right and left backside regions of the bumper to provide added structural strength to the bumper 8. It is also acknowledged that the bumper may be adapted to accommodate various other accessories known in the art utilized on military vehicles.

Figure 10:
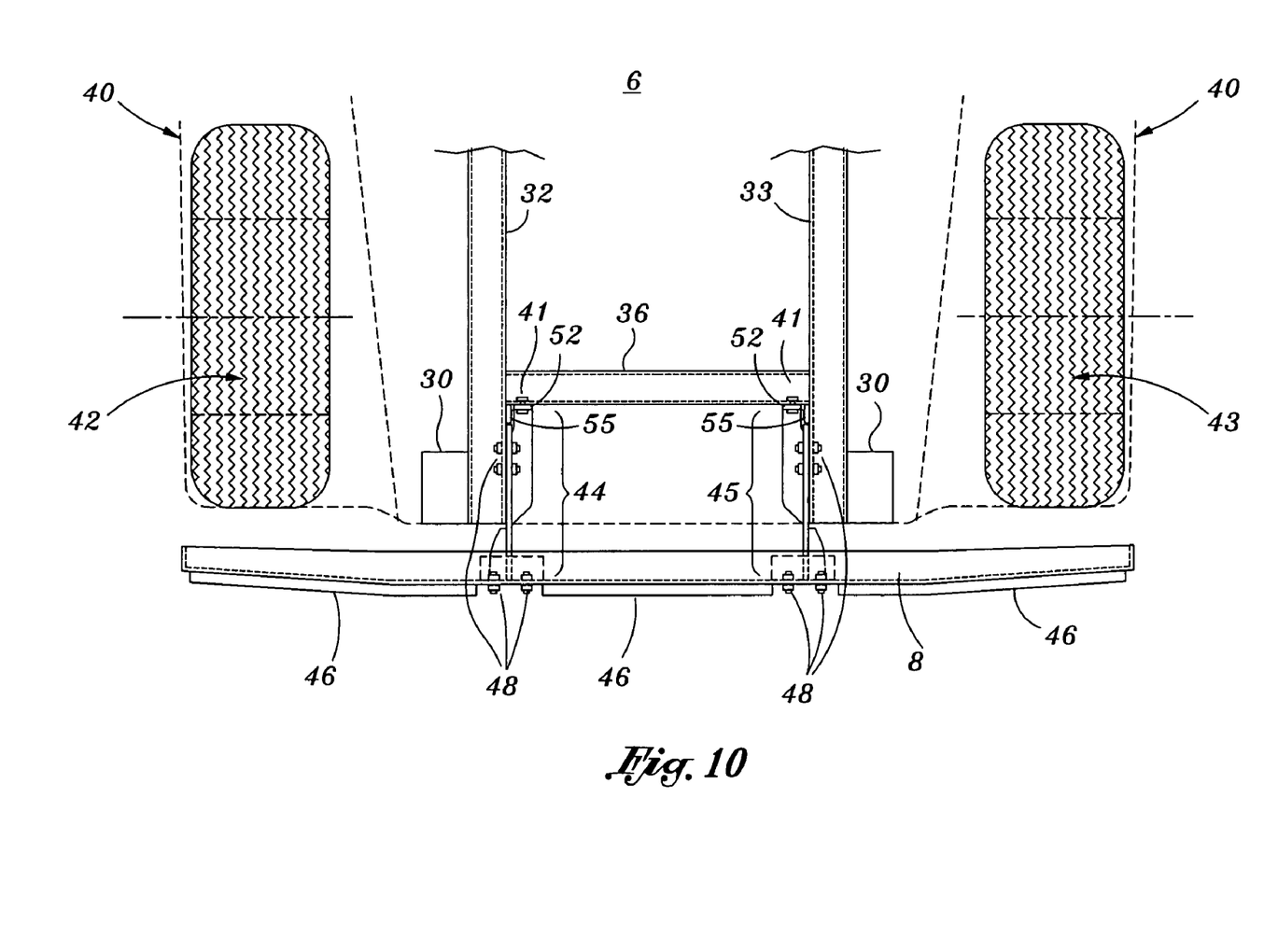
FIG. 10 is a top view of the exemplary heavy-duty bumper installed on the HUMMER H1 A1/A2, including the exemplary universal heavy-duty bracketing system, according to an aspect of the present invention.

As is best shown in FIG. 10, a rightside and leftside universal heavy-duty bumper mounting bracket 44, 45 are utilized to mount the bumper 8 to the frame members 32, 33 and to the main front crossmember 36. The rightside mounting bracket 44 is a mirror or inverse image of the leftside mounting bracket 45. The following paragraph will now describe the details of the mounting brackets 44, 45. Since the mounting brackets are essentially the same, except for being a mirror or inverse image, it will be necessary to only describe one of the brackets in detail.

Figure 8:
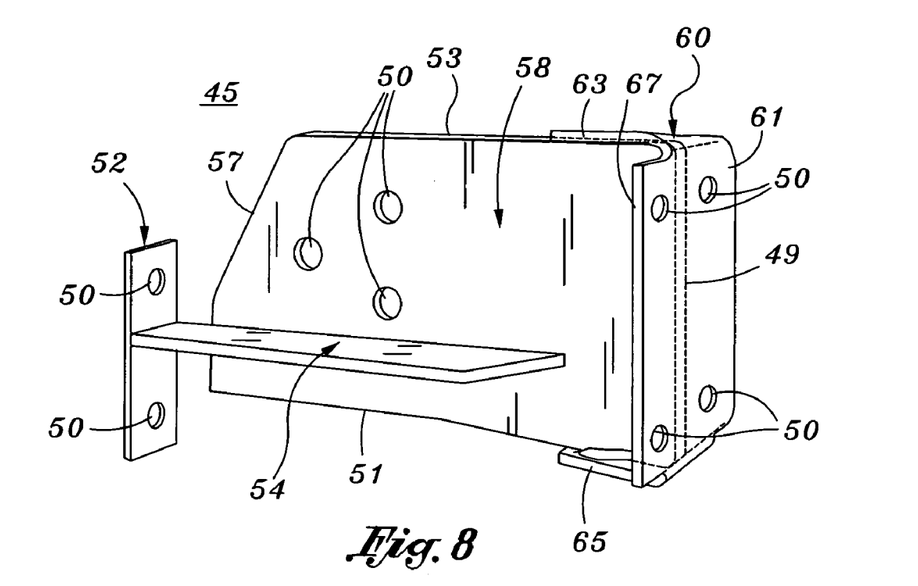
FIG. 8 is a side view perspective of an exemplary leftside universal heavy-duty bumper mounting bracket adapted for installation on both the A1 and A2, according to an aspect of the present invention.
Figure 9:
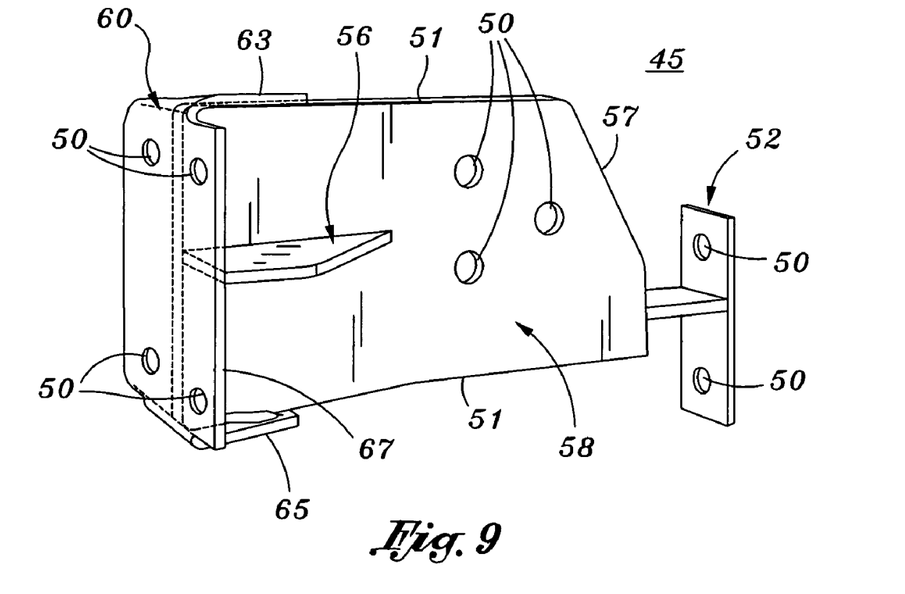
FIG. 9 is another side view perspective of the exemplary leftside universal heavy-duty bumper mounting bracket from FIG. 8, according to an aspect of the present invention.

FIG. 8 is a side view perspective of an exemplary leftside universal heavy-duty bumper mounting bracket 45 adapted for installation on both the A1 and A2, according to an aspect of the present invention; while FIG. 9 is another side view perspective of the exemplary leftside universal heavy-duty bumper mounting bracket 45 from FIG. 8, according to an aspect of the present invention. The mounting bracket 45 includes five components, including main bracket plate 58, bumper bracket adapter 60, transmember backing plate 52, inboard backing plate bracket/gusset 54 and outboard strengthening gusset 56.

In particular, the main bracket plate 58 is adapted to be mounted to the inboard side of each frame member 32, 33 (see FIG. 10). A plurality of mounting holes 50 are disposed through the main backing plate 58 for mounting the plate 58 to the inboard side of each frame member 32, 33 (see FIG. 10). The bracket plate 58 is defined by four perimeter edges including upper edge 53, lower edge 51, forward edge 49, and rearward edge 57. In the exemplary embodiment of the bracket plate 58, the upper edge 53 and the forward edge 49 are generally straight and oriented in a perpendicular manner with respect to each other. The rearward edge 57 shape is adapted to abut against or be positioned proximate thereto the structural flange 55 which is a common component to the HUMMER A1/A2 which interconnects the frame members 32, 33 to the main front frame crossmember 36. The lower edge 51 is generally straight towards the rear portion of the bracket plate 58, and inclined downward towards the forward portion of the bracket plate 58, so as to increase the length of the forward edge 49.

As can be further seen from FIGS. 8 and 9, a channel shaped bumper bracket adapter 60 is attached to the forward edge 49, a forward portion of upper edge 53 and a forward portion of the lower edge 51 in a normal or perpendicular orientation with respect to the main bracket plate 58. The adapter 60 includes a planar web 61 having a plurality of mounting holes 50 disposed there through for attaching the bumper 8. The adapter further includes an upper flange 63, lower flange 55 and inboard tab 67 integrally formed thereto the web 61.

As can be further seen from FIGS. 8 and 9, an outboard strengthening gusset 56 is provided on the forward portion of the outboard side of the main bracket plate 58 where it is attached to also to the backside of the web 61. Also, longitudinally shaped inboard backing plate bracket/gusset 54 is attached to a lower portion of the inboard side of the bracket plate 58 and extends beyond the rearward edge of the main bracket plate 58. The transmember backing plate 52 is attached to the rearward distal end of the bracket/gusset 54 in a normal/perpendicular orientation. The backing plate 52 preferably has a generally rectangular shape with a plurality of mounting holes 50 disposed there through for attachment to the front surface of the main front frame crossmember 36. It is noted that the present invention is designed such that the stock mounting fastening hardware 41 (see FIG. 3) already in place in the stock HUMMER A1/A2 may be used to fasten the backing plate 52 to the main front frame crossmember 36.

FIG. 10 is a top view of the exemplary heavy-duty bumper 8 installed on the HUMMER H1 A1/A2, including the exemplary universal heavy-duty bumper mounting brackets 44, 45. As shown in FIG. 10, the rightside universal heavy-duty bumper mounting bracket 44 is attached to the inboard side 35 (see FIG. 5) of the rightside frame member 32 such that the backing plate 52 abuts against the front surface of the main front frame crossmember 36. The leftside universal heavy-duty bumper mounting bracket 45 is attached to the inboard side 37 (see FIG. 5) of the leftside frame member 33 such that the backing plate 52 abuts against the front surface of the main front frame crossmember 36. As discussed, in-place stock fastening hardware 41 (e.g., bolts, nuts and washers) may be utilized to attach the backing plates to the main front crossmember 36. Also, the main bracket plates 58 of the mounting brackets 44, 45 are bolted to the frame members 32, 33 with fastening hardware 48 (e.g., bolts, nuts and washers). Once the bumper mounting brackets 44, 45 are installed into the HUMMER H1 A1/A2, the bumper 8 is attached to the bumper bracket adapters 60 similarly using fastening hardware 48 (e.g., bolts, nuts and washers).

FIGS. 11 through 14 depict various embodiments of the present invention. As already discussed within the specification, the present invention may take the form of various embodiments, since the present invention is based upon modularity. Therefore, the aforementioned Figures are provided merely to illustrate a few exemplary configurations of the present invention. Moreover, the present invention should not be limited to the embodiments shown in the aforementioned Figures.

Figure 11:
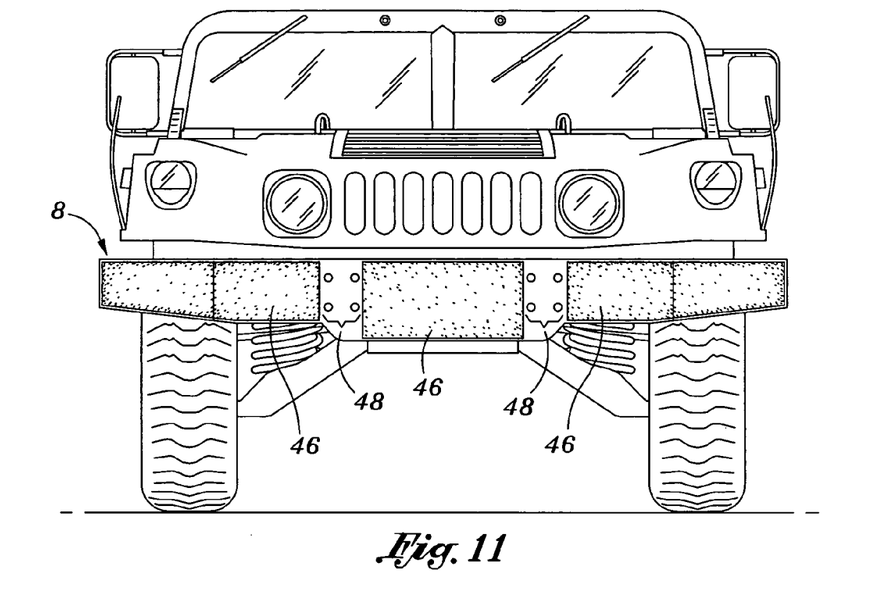
FIG. 11 a front view of the exemplary heavy duty bumper installed on the HUMMER H1 A1/A2, according to an aspect of the present invention.

FIG. 11 is a front view of the exemplary heavy-duty bumper 8 installed on the HUMMER H1 A1/A2, according to an aspect of the present invention. In this embodiment, the bumper 8 is adapted primarily for ramming/pushing objects. As can be seen in FIGS. 10 and 11, resilient bumper material 46, such as rubber, may be attached to the main bumper front fascia plate 100. In the aforementioned embodiment, the resilient material 46 is attached in three separate sections. It is also envisioned that the present invention may further include nerf-styled bumpers (longitudinally shaped vertically oriented members) which attach to the bumper 8 in the regions where the fastening hardware 48 is positioned.

Figure 12:
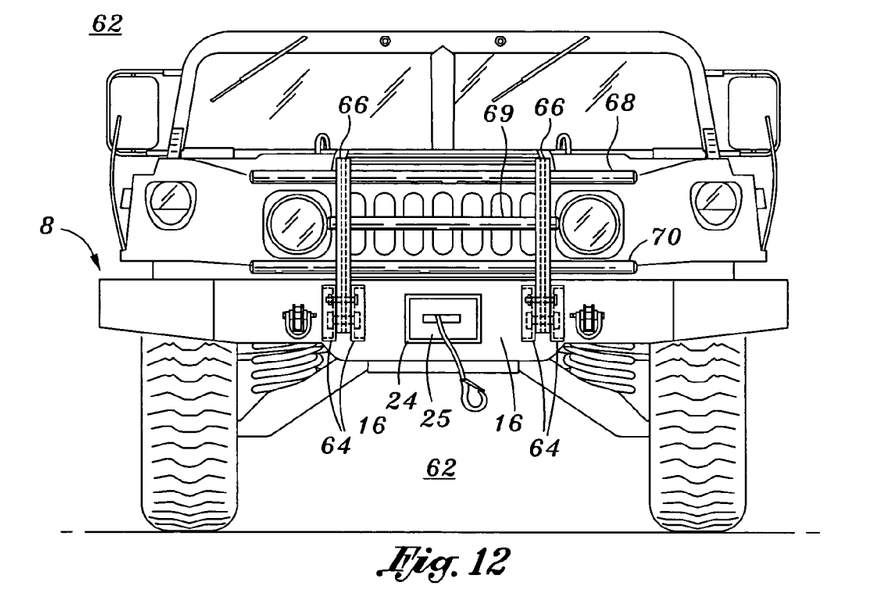
FIG. 12 is a front view of the exemplary heavy-duty bumper installed on the HUMMER H1 A1/A2 which also includes an exemplary first embodiment of a folding brush guard rotatably attached to the bumper, according to an aspect of the present invention.

FIG. 12 is a front view of the exemplary heavy-duty bumper 8 installed on the HUMMER H1 A1/A2 which also includes an exemplary first embodiment of a folding brush guard 62 rotatably attached to the bumper 8, according to an aspect of the present invention. The first embodiment of the folding brush guard 62 includes a pair of upright main support bars 66 (see also FIGS. 15–17). The main support bars 66 are each rotatably attached to a pair of heavy-duty universal swivel attachment brackets 64. Further details of the main support bars 66 and the universal swivel attachment brackets 64 are provided later in the specification with regard to FIG. 15.

The pair of main support bars 66 are adapted to transversely support a plurality of horizontally oriented tubes 68–70. For instance, in the exemplary embodiment shown in FIG. 12, a lower horizontal tube 70 transversely spans the main support bars generally underneath the headlights of the vehicle. A middle horizontal tube 69 transversely spans the brackets 64 generally between the headlights of the vehicle. And, an upper horizontal tube 68 transversely spans the brackets 64 generally above the headlights of the vehicle.

The ability to arrange the present invention in various configurations is also illustrated in FIG. 12. For example, the configuration of the present invention in FIG. 12 provides the winch port 24 such that a winch 25 may be installed behind the bumper 8. Additionally, combination tie-down/tow bar adapters 16 are installed on the bumper 8 outboard of the pair of swivel attachment brackets 64.

Figure 13:
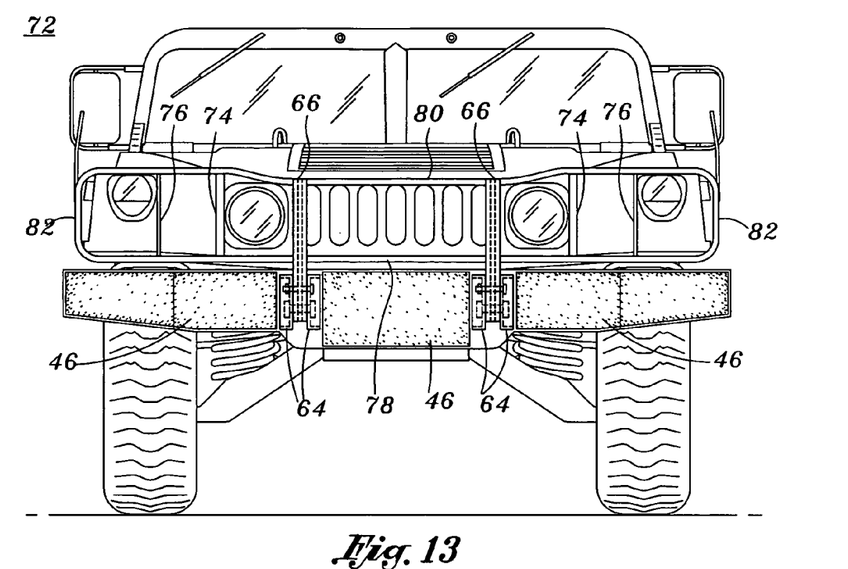
FIG. 13 is a front view of the exemplary heavy-duty bumper installed on the HUMMER H1 A1/A2 which also includes an exemplary second embodiment of a folding brush guard rotatably attached to the bumper, according to an aspect of the present invention.

FIG. 13 is a front view of the exemplary heavy-duty bumper 8 installed on the HUMMER H1 A1/A2 which also includes an exemplary second embodiment of a folding brush guard 72 rotatably attached to the bumper 8, according to an aspect of the present invention. The second embodiment of the folding brush guard 72 includes a pair of upright main support bars 66 (see also FIGS. 15–17). The main support bars 66 are each rotatably attached to a pair of heavy-duty universal swivel attachment brackets 64. Further details of the main support bars 66 and the universal swivel attachment brackets 64 are provided later in the specification with regard to FIG. 15.

The pair of main support bars 66 are adapted to transversely support a plurality of horizontally oriented tubes 78, 80. For instance, in the exemplary embodiment shown in FIG. 13, a lower horizontal perimeter tube 78 transversely spans the brackets 64 generally along the entire front-end of the vehicle above the bumper 8 and underneath the headlights. An upper horizontal perimeter horizontal tube 80 transversely spans the main support bars 66 generally along the entire front-end of the vehicle above the grill openings, headlights and blinkers. A pair of outboard vertical perimeter tubes 82 define the outer ends of the brush guard 72 by interconnecting the lower perimeter tube 78 and the upper perimeter tube 80. Furthermore, a pair of vertically oriented inboard bracing tubes members 74 interconnect the lower perimeter tube 78 and the upper perimeter tube 80 proximately just outboard of the vehicle headlights, therefore, providing a opening for the headlights. Also, a pair of vertically oriented inboard bracing bar members 76 interconnect the lower perimeter tube 78 and the upper perimeter tube 80 proximately just inboard the blinkers of the vehicle.

The ability to arrange the present invention in various configurations is further illustrated in FIG. 13. For example, the configuration of the present invention in FIG. 13 provides resilient bumper material 46, such as rubber, attached to the main bumper front fascia plate 100. In the aforementioned embodiment, the resilient material 46 is attached in three separate sections, in lieu of the winch port 24 and combination tie-down/tow bar adapters 16.

Figure 14:
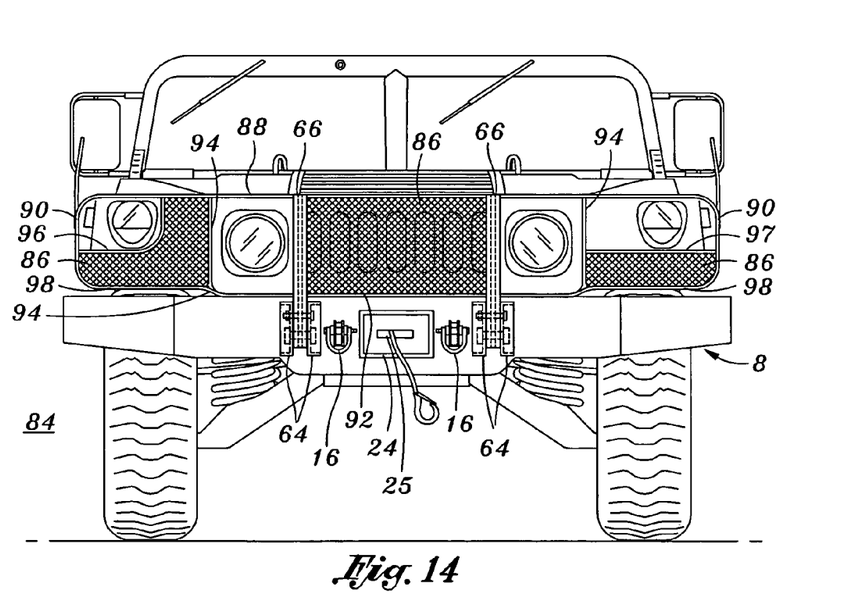
FIG. 14 is a front view of the exemplary heavy-duty bumper installed on the HUMMER H1 A1/A2 which also includes am exemplary third embodiment of a folding brush guard rotatably attached to the bumper, according to an aspect of the present invention.

FIG. 14 is a front view of the exemplary heavy-duty bumper 8 installed on the HUMMER H1 A1/A2 which also includes an exemplary third embodiment of a folding brush guard 84 rotatably attached to the bumper 8, according to an aspect of the present invention. The third embodiment of the folding brush guard 84 includes a pair of upright main support bars 66 (see also FIGS. 15–17). The main support bars 66 are each rotatably attached to a pair of heavy-duty universal swivel attachment brackets 64. Further details of the main support bars 66 and the universal swivel attachment brackets 64 are provided later in the specification with regard to FIG. 15.

The pair of main support bars 66 are adapted to transversely support a plurality of horizontally oriented bars. For instance, in the exemplary embodiment shown in FIG. 14, a lower horizontal perimeter bar 92 transversely spans the main support bars 66 generally along the front-end of the vehicle above the bumper 8 and underneath the headlights and grill where the bar 92 forms upward elbows connected to a pair of upright headlight cutout bars 94. An upper horizontal perimeter bar 88 transversely spans the main support bars 66 generally along the entire front-end of the vehicle above the grill openings, headlights and blinkers. The pair of upright headlight cutout bars 94 are arranged to be interconnected to the upper horizontal perimeter bar 88. A pair of outer lower perimeter bars 98 extend off the upright elbows and a pair of outboard vertical perimeter bars 90 defining the outer ends of the brush guard 84 are interconnected to the upper horizontal perimeter bar 88. Additionally, an elbow-shaped right blinker bar 96 interconnects the right vertical perimeter bar 90 and a right portion of the upper horizontal perimeter bar 88, providing an opening for the blinkers. Moreover, a straight left blinker bar 97 interconnects the left vertical perimeter bar 90 and the left main support bar 66.

The ability to arrange the present invention in various configurations is also illustrated in FIG. 14. For example, the configuration of the present invention in FIG. 14 provides the winch port 24 such that the winch 25 may be installed behind the bumper 8. Additionally, combination tie-down/tow bar adapters 16 are installed on the bumper 8 between the pair of swivel attachment brackets 64 and the winch port 24.

Figure 15:
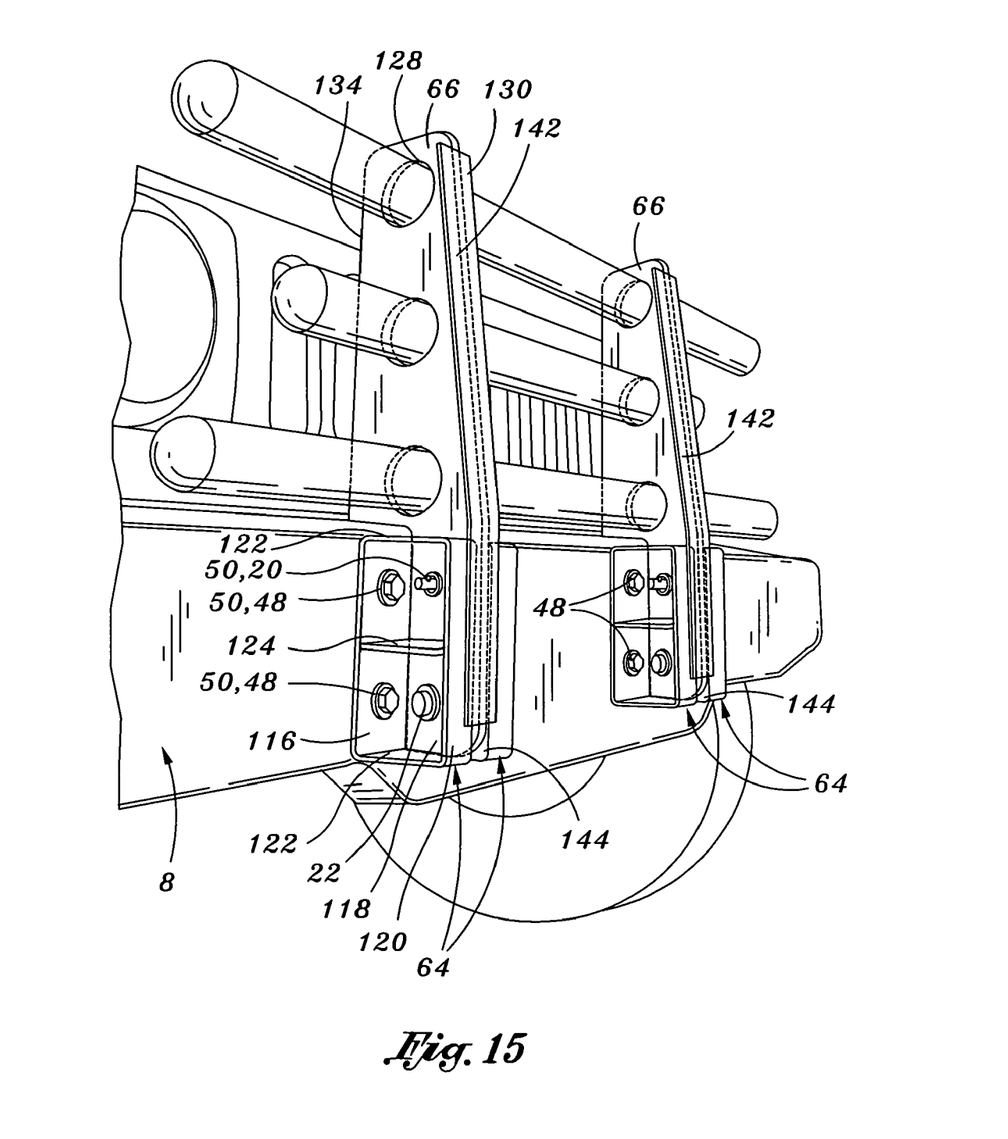
FIG. 15 is a close-up perspective view of a exemplary pair of heavy-duty universal brush guard swivel attachment brackets, according to an aspect of the present invention.

FIG. 15 is a close-up perspective view of both exemplary pairs of heavy-duty universal brush guard swivel attachment brackets 64, the mounting hardware for the same 22, 48, 50, and the upright main support bars 66, according to an aspect of the present invention. A typical brush guard installation will utilize four swivel attachment brackets 64, including a pair for the left upright main support bar 66 and a pair for the right upright main support bar 66. As shown in FIGS. 12–15, each pair of brackets 64 are positioned such that they create a gap 144 in which the upright main support bars are received therein.

Each universal brush guard swivel attachment bracket 64 includes a bumper attachment plate 116, swivel interface plate 118, outer protector plate 120, a pair of end plates 122, and an intermediate gusset 124. In the preferred embodiment, the bumper attachment plate 116, swivel interface plate 118 and outer protector plate 120 are rectangular in shape. The bumper attachment plate 116, which is adapted to interface to the bumper front fascia plate 100, preferably is wider than the outer protector plate 120. A pair of mounting holes 50 are disposed through the bumper attachment plate 116 for attaching the swivel attachment bracket 64 to the bumper 8. Fastening hardware 48 (e.g., such as bolts, nuts and washers) may be utilized to fasten the swivel attachment brackets 64 to the bumper 8. Additionally, a pair of mounting holes 50 are also disposed through the swivel interface plate 118 which forms a side of the gap 144. The upper hole 50 on the swivel interface bracket 118 is adapted to received a removable pin 20. The lower hole 50 on the swivel interface bracket 118 is adapted to receive rotatable fastening hardware 22 such that upright main support bar 66 of the brush guard may rotate from an upright position, as shown in FIG. 15, to a lowered horizontal position as shown in FIGS. 16 and 17.

The upright main support bars 66 are preferably formed from a flat member which may include a plurality of bar holes 128 for receiving brush guard bars/tubes. The support bars include a lower rotating arm portion 132 defined by a straight lower inner arm edge 140 and a straight lower outer arm edge 138 oriented in a generally parallel orientation with respect to each other and a lower end edge interconnecting the inner and outer edges 140, 138. As discussed, the lower rotating arm portion 132 is adapted to be received in the gap 144 such that it may rotate. An upper portion of the main support bar is integrally formed to an upper portion of the rotating arm portion 132, the upper portion defined by a bumper notch 126 projecting outward from an upper end of the lower inner arm edge 140 of the rotating arm portion 132 in a perpendicular orientation. A straight inside upper edge 134 connects to an end of the bumper notch 126 and projects upward in a perpendicular orientation. An upper distal end side 136 connects to an upper end of the straight inside upper edge 134 and projects inward in a perpendicular orientation. A forward inclined edge 130 projects downward from the upper distal end side 136 and connects to an upper end of the lower outer arm external bumper strip 142 is attached to forward inclined edge 130 and lower out arm edge 138 of each upright main support bar.

Figure 16:
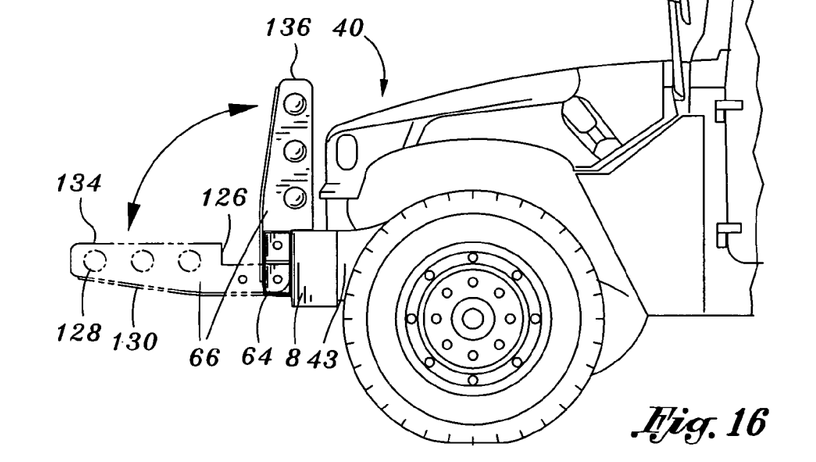
FIG. 16 is a side view of a HUMMER H1 A1/A2, with the bumper and a brush guard installed, illustrating the ability of the brush guard to swivel from an upright position to a horizontal position, according to an aspect of the present invention.
Figure 17:
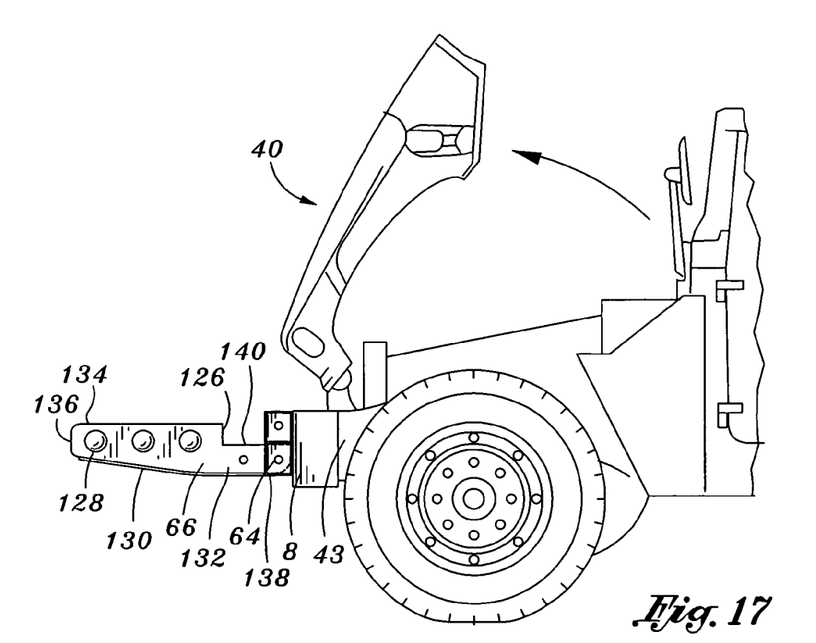
FIG. 17 is the same side view from FIG. 16 of the HUMMER H1 A1/A2, wherein the hood of the HUMMER is opened, illustrating the ability of the brush guard to swivel from an upright position to a horizontal position allowing ample clearance for the hood to open, according to an aspect of the present invention.

FIG. 16 is a side view of a HUMMER H1 A1/A2, with the bumper 8 and a brush guard installed, illustrating the ability of the brush guard to swivel from an upright position to a horizontal position, according to an aspect of the present invention. While FIG. 17 is the same side view from FIG. 16 of the HUMMER H1 A1/A2, wherein the hood 40 of the HUMMER is opened, illustrating the ability of the brush guard to swivel from an upright position to a horizontal position allowing ample clearance for the hood 40 to open, according to an aspect of the present invention.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such are within the scope of the appended claims.

What is claimed is:

1. A universal heavy-duty bumper and mounting system adapted to be attached to a HMMWV H1 A1 or A2 configured vehicle comprising:
   a rightside and left side universal heavy-duty bumper mounting bracket, each bracket comprising,
      a planar main bracket plate having an inboard side and outboard side, the bracket plate adapted to be interfaced and attached to an inboard side surface of one the rightside or leftside frame members;
      a channel shaped bumper bracket adapter attached to a forward edge of the main bracket plate in a generally perpendicular orientation;
      a planar outboard strengthening gusset attached to the outboard side of the main bracket plate and to an inner side of the channel shape bumper in a perpendicular orientation;
      a longitudinal and planar inboard backing plate bracket/gusset attached to the inboard side of the main bracket in a perpendicular orientation, wherein the bracket/gusset extends beyond the rearward edge of the main bracket plate; and
      a generally rectangular transmember backing plate attached to the bracket/gusset in a perpendicular orientation, the backing plate adapted to be interfaced and abut against a main front crossmember of the H1; and
   a heavy-duty bumper adapted to be received and attached by the rightside and leftside bumper brackets such that the bumper transversely spans both brackets in a perpendicular orientation.

2. The universal bumper and mounting system according to claim 1, further comprising a couple pairs of heavy-duty universal swivel attachment brackets for receiving accessories, each swivel attachment bracket adapted to be mounted on a front fascia plate of the bumper, each swivel attachment bracket comprising,
   a generally rectangular shaped bumper attachment plate adapted to be interfaced to the bumper;
   a generally rectangular shaped swivel interface plate attached to a longitudinal edge of the bumper attachment plate in a perpendicular orientation;
   an outer protector plate attached to a forward longitudinal edge of the swivel attach plate such that the protector plate is positioned over the bumper attachment plate in a parallel and opposing orientation;
   a pair of end plates positioned at upper and lower end edges of each of the bumper attachment plate, swivel interface plate and outer protector plate; and
   an intermediate gusset positioned in a middle region of each of the bumper attachment plate, swivel interface plate and outer protector plate.

3. The universal bumper and mounting system according to claim 2, wherein for each pair of swivel attachment brackets, the swivel interface plate for each bracket is positioned next to each other in a parallel orientation such that a gap is provided between each swivel interface plate, wherein the gap is adapted to receive an accessory.

4. The universal bumper and mounting system according to claim 3, further comprising an upright main support bar disposed within each gap defined by each pair of swivel attachment brackets, wherein each upright main support bar is adapted to rotate from an upright position to a lowered position.

5. The universal bumper and mounting system according to claim 4, each upright main support bar comprising a planar plate defined by,
   a lower rotating arm portion defined by an straight lower inner arm edge and a straight lower outer arm edge oriented in a parallel orientation with respect to each other and a lower end edge interconnecting the inner and outer arm edges, the lower rotating arm adapted to be received and rotatably attached within the gap; and
   an upper portion of the arm integrally formed to an upper region of the rotating arm portion, the upper portion defined by a bumper notch projecting outward from an upper end of the inner arm edge of the rotating arm portion in a perpendicular orientation, a straight inside upper edge connecting to an end of the bumper notch and projecting upward in a perpendicular orientation, an upper distal end side connecting to an upper end of the inside straight upper edge and projecting forward in a generally perpendicular orientation, a forward inclined edge projecting downward from the upper end and connecting to an upper end of the lower outer arm edge of the lower rotating arm portion.

6. The universal bumper and mounting system according to claim 5, further comprising an external bumper strip attached to the forward inclined edge and lower outer arm edge of each upright main support bar in a perpendicular orientation.

7. The universal bumper and mounting system according to claim 6, wherein a plurality of receiving holes are disposed through the planar plate of each upright main support bar.

8. The universal bumper and mounting system according to claim 7, further comprising a plurality tubes received within the plurality of receiving holes such that the plurality of tubes span each upright main support bar in a generally perpendicular orientation, wherein the plurality of tubes form at least a portion a brushguard.

9. The universal bumper and mounting system according to claim 1, the bumper including a planar main fascia plate having a perimeter shape defined by a generally straight upper side, a tiered lower side, and a pair of generally straight side edges interconnecting the upper and lower sides.

10. The universal bumper and mounting system according to claim 9, further comprising a planar side edge connected to and surrounding the perimeter of main fascia plate in a perpendicular orientation with respect to the main fascia plate and projecting in a backwards direction with respect to the main fascia plate.

11. The universal bumper and mounting system according to claim 10, wherein a winch port is disposed through the main fascia plate.

12. A universal heavy-duty bumper mounting bracket adapted to be attached to a main front frame crossmember and one of a rightside or leftside frame member of a HMMWV H1 A1 or A2 configured vehicle, the mounting bracket comprising:
a substantially planar main bracket plate having an inboard side and outboard side, the main bracket plate adapted to be interfaced and attached to an inboard side surface of one of the rightside or leftside frame member, the main bracket plate including,
a generally straight horizontally oriented upper edge;
a generally straight forward edge arranged in a perpendicular orientation with respect to the upper edge;
a rearward edge adapted to abut against or be positioned proximate to a structural flange attached to a main front crossmember and one of the rightside or leftside frame member of the H1; and
a lower edge having a generally straight rear portion connected to the rear edge and a downwardly inclined forward portion connected to the forward edge,
wherein a plurality of mounting holes are disposed through the main bracket plate for attaching the mounting bracket to one of the rightside or leftside frame member;
a channel shaped bumper bracket adapter attached to the main bracket plate in a generally perpendicular orientation, the bumper bracket adapter including a web having an outer side and inner side, and an upper and lower flange integrally formed to the web,
wherein the web is attached to the forward edge of the main bracket plate, the upper flange is attached to a forward portion of the upper edge of the main bracket plate, and the lower flange is attached to the downwardly inclined forward portion of the main bracket plate,
wherein a plurality of mounting holes are disposed through the web for receiving bumper fastening hardware;
a planar outboard strengthening gusset attached to the outboard side of the main bracket plate and to the inner side of the web in a perpendicular orientation;
a longitudinal and planar inboard backing plate bracket/gusset attached to the inboard side of the main bracket in a perpendicular orientation, wherein the bracket/gusset extends beyond the rearward edge of the main bracket plate; and
a generally rectangular transmember backing plate attached to the bracket/gusset in a perpendicular orientation, the backing plate adapted to be interfaced against the main front crossmember of the H1,
wherein a plurality of mounting holes are disposed through the backing plate for attaching the backing plate the main front frame crossmember.

* * * * *